United States Patent [19]
Latvis et al.

[11] Patent Number: 5,624,589
[45] Date of Patent: Apr. 29, 1997

[54] SEGREGATED COOLING AIR FLOW FOR ENGINE DRIVEN WELDER

[75] Inventors: Steven D. Latvis, Appleton; Ross C. Borchardt, Hortonville, both of Wis.

[73] Assignee: Illinois Tool Works INC., Glenview, Ill.

[21] Appl. No.: 526,495

[22] Filed: Sep. 11, 1995

[51] Int. Cl.$^6$ .................................................. B23K 9/00
[52] U.S. Cl. ........................................... 219/133; 290/113
[58] Field of Search ............................ 219/133, 134; 290/1 A, 1 B; 181/204

[56] References Cited

U.S. PATENT DOCUMENTS

| | | | |
|---|---|---|---|
| 4,702,201 | 10/1987 | Odo et al. | 290/1 B |
| 4,733,750 | 3/1988 | Poirier et al. | 181/204 |
| 4,835,405 | 5/1989 | Clancey et al. | 290/1 B |
| 5,121,715 | 6/1992 | Nogami et al. | 181/204 |
| 5,433,175 | 7/1995 | Hughes et al. | 290/1 A |
| 5,515,816 | 5/1996 | Ball et al. | 290/1 B |

*Primary Examiner*—Clifford C. Shaw
*Attorney, Agent, or Firm*—SCHWARTZ & WEINRIEB

[57] ABSTRACT

An engine driven welding machine has two paths of cooling air flowing therethrough that are segregated from each other. Both paths have their inlets at the electrical end of the welding machine, and both paths have their exhausts at the machine engine end. The first path directs air through a passage containing a rectifier and into a blower housing. The blower housing divides the first path into a first portion that supplies combustion air to the engine. A second portion of the first path directs air over outer walls of the engine block and head and into a hot air exhaust box, from which the air exhausts from the machine. The second path directs air over a stabilizer and into a generator. From the generator, the second path leads to an engine compartment, from which the air exhausts. The first and second paths direct the cooling air through multiple turns that reduce machine noise.

18 Claims, 3 Drawing Sheets

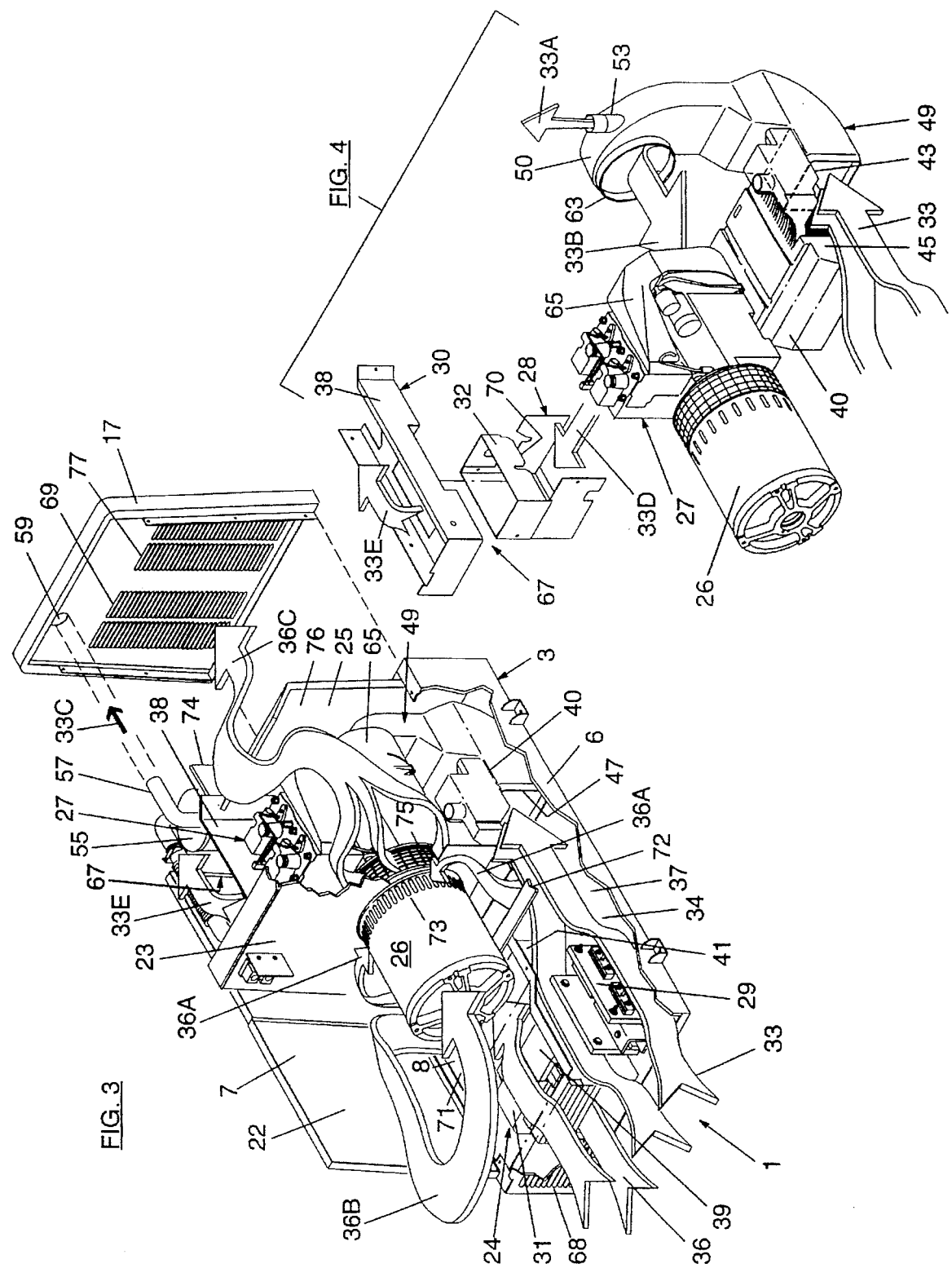

SEGREGATED COOLING AIR FLOW FOR ENGINE DRIVEN WELDER

BACKGROUND OF THE INVENTION

1. Field of the Invention

This invention pertains to heat transfer, and more particularly to cooling and noise suppression of welding machines.

2. Description of the Prior Art

Engine driven welding machines produce considerable heat. Sources of the heat include the engine as well as various electrical components such as rectifiers, stabilizers, and generators. For effective operation of the welding machine, sufficient heat must be removed to keep the engine and electrical components at proper operating temperatures. The rectifier, stabilizer, and generator are usually the most critical electrical components that must be cooled because the output of the welding machine is limited by the rise in temperature of those components.

Some prior machines utilized different fans to produce separate air flows through the engine and electrical compartments. Other prior machines were designed such that the entire machine formed a single air-cooled plenum.

The prior cooling efforts were not completely satisfactory. Many of the air flow paths were quite short between intake and exhaust, with the result that some spaces of the compartments were not adequately cooled.

A related deficiency of the air cooling systems of prior welding machines concerned noise. The primary source of noise in an engine driven welding machine is caused by the mechanical and combustion noise of the engine. To a lesser degree, the generator also creates noise, especially its fan. Some of the mechanical and combustion noise of the engine can radiate through the cylinder walls and head into the engine compartment, and this noise needs to be either muffled or contained. In addition, this noise, especially the valve and combustion noise, can travel back up the intake manifold and through the air cleaner or intake passageway and out to the atmosphere. This is potentially a major source of noise.

The earliest way of cooling an engine driven welding machine was to leave it open to the atmosphere. In an attempt to reduce the noise, a box was built around the machine. Unfortunately, the box inhibited cooling and intake combustion air flow such that the welder could not be cooled or run efficiently. Accordingly, ducts were incorporated into the box in order to introduce air for combustion and cooling. However, the ducts allowed the escape of noise, unless the ducts were positioned and routed in such a way that the noise that was generated at one end of the ducts was reduced inside them. The ducts of prior welding machines were often too short and straight to have much success in reducing noise.

SUMMARY OF THE INVENTION

In accordance with the present invention, a segregated cooling air flow is provided that effectively and quietly cools engine driven welding machines. This is accomplished by apparatus that directs cooling air along two separate paths with each path flowing over both the engine and the electrical components.

Both air paths have their inlets at an electrical end of the welding machine, and both paths exhaust from an engine end of the machine. The first path begins with a passage that contains an electrical rectifier. The passage continues to a divider wall between an engine compartment and an electrical compartment through a channel or recess in the engine fuel tank. At the end of the recess in the fuel tank, the passage connects to the inlet of a blower housing located in the engine compartment. The blower housing divides the first path in two. A first portion of the first path flows to the engine intake filter and intake manifold for combustion air. The products of combustion pass through a muffler and exhaust out the engine end of the welding machine.

A second portion of the first path flows from the blower housing to an engine shroud. A blower that is part of the engine is located in the engine shroud. The engine blower draws the air along the first path from the inlet thereof to the engine shroud. The engine shroud covers various channels in the outer walls of the cylinder block and head of the engine. The engine blower pushes the air through the engine channels and over the combustion heads into a hot air exhaust box. In the hot air exhaust box, the second portion of the first cooling air path passes over the exhaust manifold, over the muffler, and exhausts out the engine end of the machine through one set of louvers.

The second path of cooling air has its inlet at an electrical compartment at the electrical end of the welding machine. A stabilizer for the welding power circuit is located near the second path inlet. Various baffles and deflectors assure that air also passes over all the other components in the electrical compartment. A generator is located in the divider wall. A generator fan draws the air along the second path through the electrical compartment to the generator. Most of the air flows through the interior of the generator for its entire length. Some air flows over the outside of the generator and enters its interior through radial slots in the generator barrel. The generator fan pushes all the air into the engine compartment. The air flows over a part of the engine and exhausts from the machine engine end through a second set of louvers. In this manner, air flows in two discrete paths for the full length of the welding machine. The two paths do not mix within the machine, although they do cross over one another within the engine compartment.

It is a feature of the present invention that the cooling air also serves to reduce the noise of the engine driven welding machine. The air paths are designed with numerous bends. The bends diminish the propagation of noise through the air paths upstream and downstream from the sources of noise without restricting air flow. To minimize any possible drumming effect from the blower housing of the first path, the inside and outside surfaces of the blower housing are covered with an acoustical padding.

The method and apparatus of the invention, using segregated cooling air flows, thus cools and quiets the engine and electrical components of an engine driven welding machine in an efficient manner. By locating the electrical components, particularly the stabilizer and the rectifier, at the inlet ends of separate air paths, cool ambient air cools those components very effectively. The probability of any components of the welding machine overheating is remote, even though numerous heat producing components are incorporated into the machine.

BRIEF DESCRIPTION OF THE DRAWINGS

Other advantages, benefits, and features of the present invention will become apparent to those skilled in the art upon reading the detailed description of the invention in conjunction with the drawings in which like reference characters designate like or corresponding parts throughout the several views, and wherein:

FIG. 3 is an exploded broken view of the welding machine schematically showing the segregated cooling air flow according to the present invention.

FIG. 4 is an exploded perspective view of the blower housing, engine, and hot air exhaust box schematically showing the air flow therethrough.

DETAILED DESCRIPTION OF THE PREFERRED EMBODIMENT

Although the disclosure hereof is detailed and exact to enable those skilled in the art to practice the invention, the physical embodiments disclosed herein merely exemplify the invention, which may be embodied in other specific structure. The scope of the invention is defined in the claims appended hereto.

Figure 1:
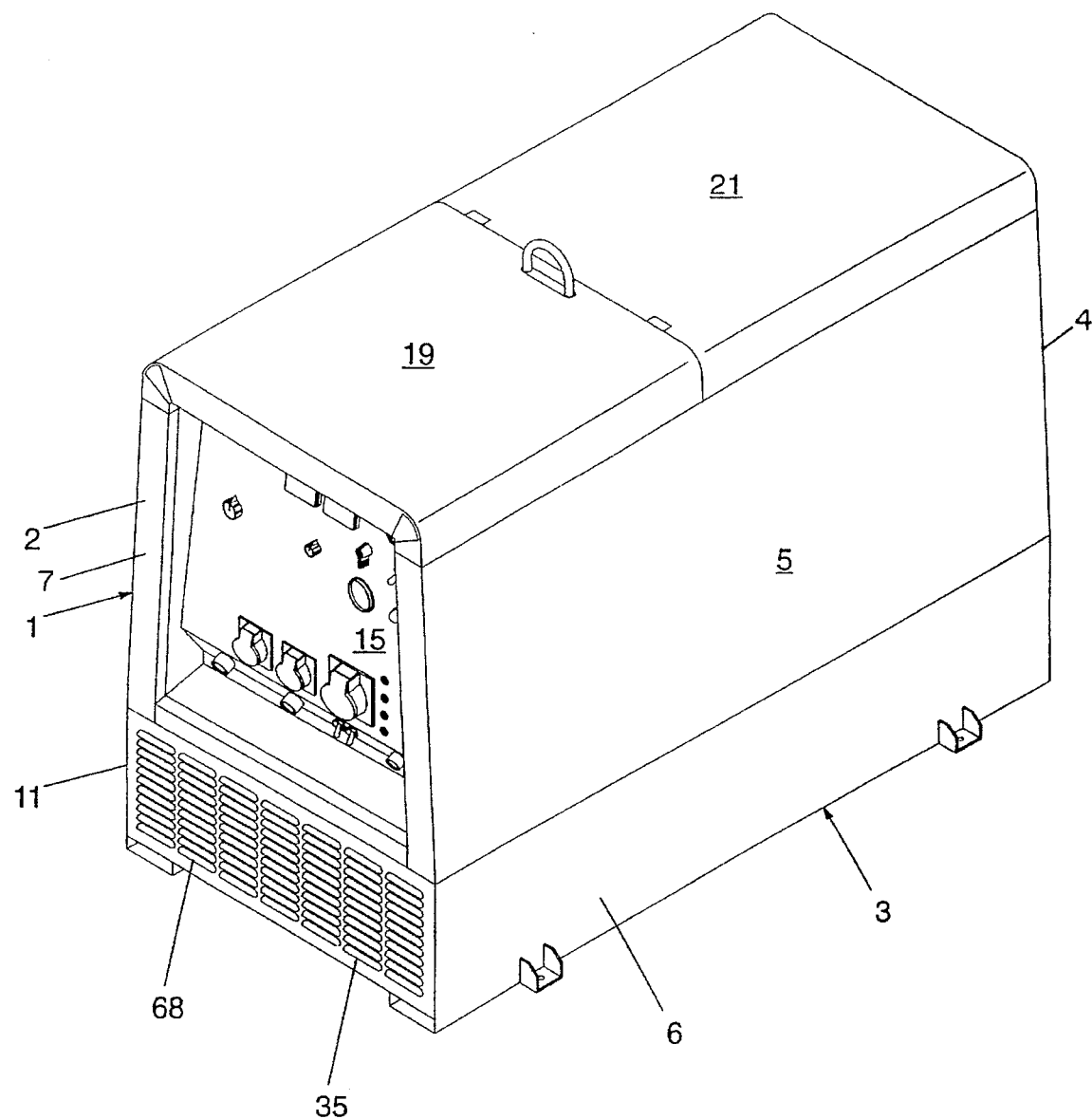
FIG. 1 is a perspective view of an engine driven welding machine, viewed from the electrical end, that includes the present invention.
Figure 2:
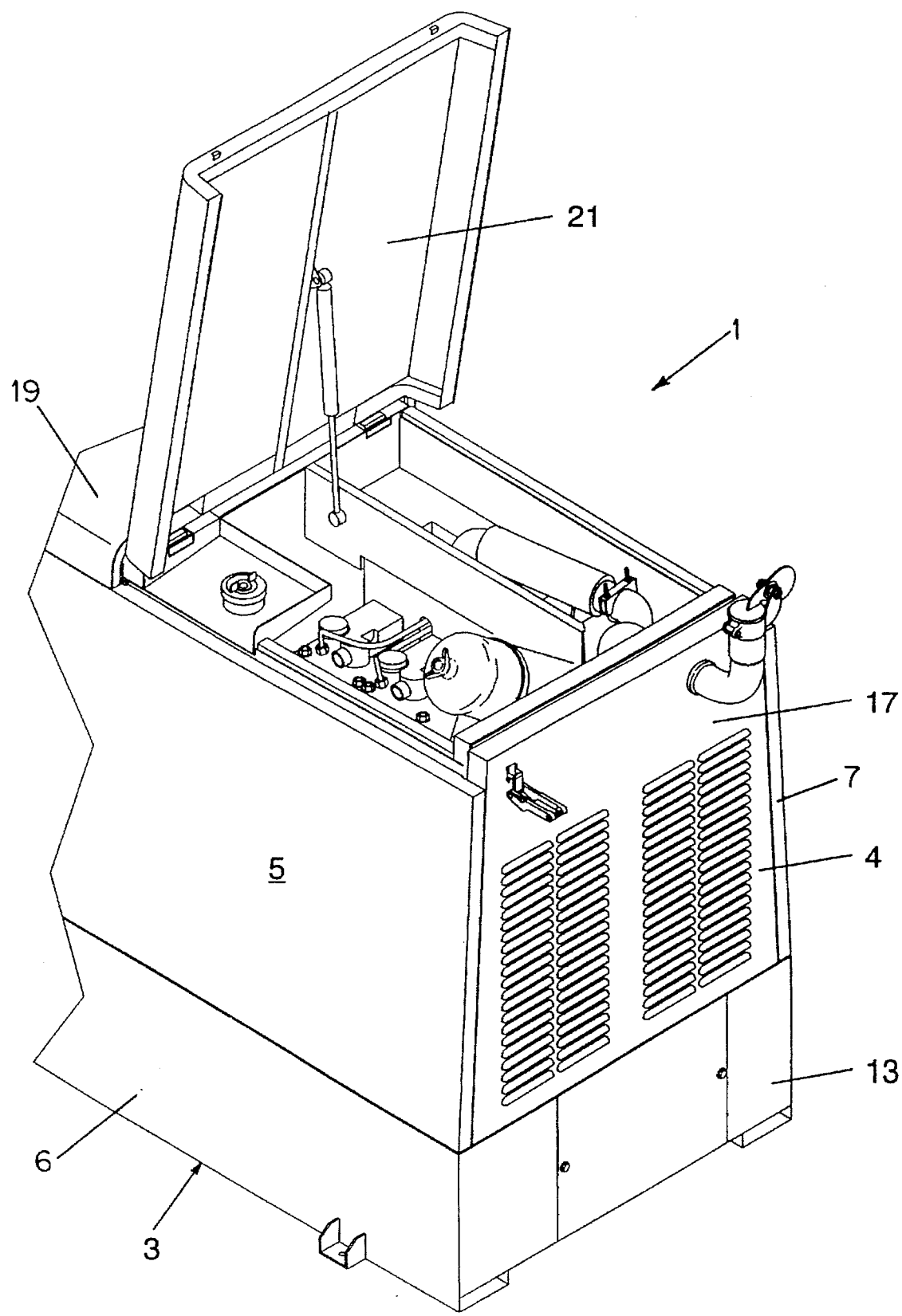
FIG. 2 is perspective view of the welding machine of FIG. 1 viewed from the engine end thereof.

Referring to FIGS. 1–3, an engine driven welding machine 1 is illustrated that includes the present invention. The welding machine 1 has a first end 2 that will be referred to as the electrical end, and a second end 4 that will be referred to as the engine end. The welding machine 1 has a base 3 that extends for the full length of the machine 1. The base 3 has a floor 37, two side covers 6 and 8, a base electrical end cover 11, and a base engine end cover 13.

The base 3 supports side panels 5 and 7, an electrical end panel 15, an engine end panel 17, and top covers 19 and 21. A divider wall 23 extends between the base floor 37, base side covers 6 and 8, and side panels 5 and 7 to the top covers 19 and 21. A horizontal plate 39 extends between the base covers 6, 8, and 11 and the divider wall 23. There is an opening 72 in the horizontal plate 39 near the divider wall 23. A vertical plate 41 extends from the divider wall 23 to the base end cover 11 between the horizontal plate 39 and the base floor 57. The divider wall 23, base covers 8 and 11, panels 5, 7, and 15, vertical plate 41, horizontal plate 39 between the vertical plate 41 and the base side cover 6, and the top cover 19 define an L-shaped electrical compartment 22 of the welding machine 1. Well known electrical components, generally represented by reference numeral 24, are housed in the electrical compartment 22. A generator 26 is located in an opening through the divider wall 23. One end of the generator 26 protrudes into the electrical compartment 22.

An internal combustion engine 27, which may be gasoline or diesel, is mounted up on the machine base 3 between the divider wall 23 and the engine end panel 17. The engine 27 drives the generator 26, which in turn supplies electrical power to the electrical components 24 for ultimately producing welding power.

In accordance with the present invention, the welding machine 1 is cooled and quieted by a segregated cooling system that properly balances the cooling requirements of the various electrical components 24 and the engine 27. For that purpose, the interior of the welding machine between the divider wall 23 and the engine end panel 17 is divided into an engine compartment 25 and a hot air exhaust box 67. Looking also at FIG. 4, the hot air exhaust box 67 is composed of a first duct 28 and a second duct 30. The ducts 28 and 30 have respective panels 32 and 38 that together form a horizontal and vertical plenum panel that extends between the divider wall 23 and the engine end panel 17. The base covers 6 and 13, panels 5 and 17, divider wall 23, top cover 21, and duct vertical panels 32 and 38 define the engine compartment 25. The engine 27 is mounted in the engine compartment 25.

The four most critical components of the welding machine 1 from a cooling standpoint are the generator 26, the engine 27, and a rectifier 29 and a stabilizer 31 that are part of the electrical components 24. Proper cooling is provided to the foregoing components by two separate and independent paths 33 and 36 of cooling air flowing through the welding machine 1. Both paths 33 and 36 begin at the machine electrical end 2, and both paths end at the machine engine end 4. The inlet for the first path 33 is through louvers 35 in the base electrical end cover 11. The beginning of the first path 33 is a horizontal passage 34 that is defined by the base floor 37, base side cover 6, horizontal plate 39, and vertical plate 41. The rectifier 29 is attached to the base floor 37 in the passage 34 at the upstream end of the first path 33.

The passage 34 continues along a channel or recess in the engine fuel tank 40. For the length of the fuel tank 40, two sides of the passage 34 are formed by the base floor 37 and side wall 6. The two other sides of the passage 34 are formed by a horizontal wall 43 and a vertical wall 45 of the recess in the fuel tank 40. The passage 34 terminates at the inlet end 47 of a blower housing 49, which is located in the engine compartment 25. The blower housing inlet end 47 fits into the fuel tank recess.

The blower housing 49 directs the first path 33 from the horizontal passage 34 into a vertical orientation. At the outlet end 50 of blower housing 49 are two outlet ports 53 and 63, such that the first air path 33 divides in two. A first portion 33A leaves the blower housing 49 through the vertically oriented first port 53. The port 53 is connected to an engine air cleaner, not illustrated but well known in the internal combustion engine arts. Vacuum produced by the engine 27 draws the air first portion 33A from the blower housing 49 into the engine air cleaner. The first portion 33A serves as combustion air for the engine and thus passes from the air cleaner to the engine intake manifold. The convoluted paths 33 and 33A also serve to reduce the engine valve and combustion noise that travels up the intake manifold and air cleaner. The first portion 33A of the first path 33 ultimately flows into an engine muffler 55. A muffler exhaust pipe 57 vents through the engine end panel 17 by means of an exhaust port 59, as is indicated by path 33C.

A second and major portion 33B of the first air path 33 is redirected horizontally by the blower housing 49 through the second outlet port 63. The second port 63 is resiliently connected to the inlet of an engine shroud 65. A blower, which is a standard part of the engine 27, is located inside the shroud 65. It is the operation of the engine blower and combustion air intake that creates a vacuum to draw air along the first path 33 through the passage 34 and blower housing 49. To allow for engine vibrations and deflections and to minimize any drumming effect of noise associated with the blower housing 49, the inner surface of its outlet port 63 is wrapped with an acoustical padding. The outlet port 63 fits around the padded inlet of the engine blower shroud 65 so as to form a foam air tight seal that does not transmit engine vibrations.

The second portion 33B of the first path 33 passes generally horizontally through several different channels in the outer walls of the cylinder block and head of the engine 27 that are covered by the engine shroud 65. When passing through the various engine channels, the air cools the combustion heads and cylinders of the engine. After leaving the engine channels, the air flows through an opening 70 in the duct 28 and enters the hot air exhaust box 67, as is indicated by path 33D, where it cools the exhaust manifold. The hot air exhaust box 67 is segregated from the engine compartment 25 by the panel 38 and by a vertical wall 74 that abuts the engine end panel 17. The second portion 33B of the first path 33 then flows through the ducts 28 and 30, as is indicated by path 33E. The duct 28 is attached to the engine and vibrates with it. The duct 30 is mounted up on the machine frame and thus is stationary. There is a foam seal between the two ducts. From the duct 30, the path 33E flows downwardly over the muffler and exhausts through louvers 69 in the left side of the engine end panel 17. The numerous bends of the paths 33B, 33D, and 33E reduce the mechanical and combustion noise of the engine that radiates through the cylinder block walls and head.

Thus, all the air in the first path 33 cools the rectifier 29. Then the first path divides in two to supply combustion air to the engine 27 with the first portion 33A, and to cool and quiet the combustion heads of the engine 27 with the second portion 33B. The combustion air 33A leaves the welding machine 1 via by means the muffler 55 as path 33C. The engine exterior cooling air 33B flows into the hot air exhaust box 67 as path 33D and exhausts from the hot air exhaust box 67 through the engine end panel 17 as path 33E.

The inlet for the second air path 36 is through louvers 68 in the base electrical end cover 11. The beginning of the second path is a bottom section 71 of the electrical compartment 22. The bottom section 71 is defined by the base floor 37 and side wall 8, the vertical plate 41, the horizontal plate 39, and the divider wall 23. The stabilizer 31 is secured to the base floor 37 in the electrical compartment bottom section 71 and thus is at the upstream end of the second path 36.

The air of the second path 36 then flows upwardly through an opening 72 in the horizontal plate 39 into an upper section of the electrical compartment 22. Upon reaching the electrical compartment upper section, the path 36 divides in two. A first portion, indicated by paths 36A, enters radial slots 73 in the barrel of the generator 26. A second portion, indicated by path 36B, flows into the end of the generator barrel. The two portions 36A and 36B rejoin and mix inside the generator 26. A fan inside the generator 26 creates the vacuum that draws the air along the paths 36, 36A, and 36B. The fan pushes the remixed air through outlets 75 in the generator as a single path 36C. The generator outlets 75 are located in the engine compartment 25. The engine path 36C flows over various engine components, including the shroud 65, in the engine compartment 25. The path 36C must then flow up and over a padded interior wall 76 so that the engine 27 is not in the line of sight with the exhaust louvers 77. The path 36C exhausts from the welding machine 1 through the louvers 77 in the right side of the engine end panel 17. The paths 36A, 36B, and 36C change direction so as to reduce noise produced by the generator fan and the engine 27, which could exit the welding machine 1 were they straight line paths.

In summary, the engine driven welding machine 1 is cooled and quieted by two segregated paths of air flowing through it. All the air of the first path 33 first cools the rectifier 29 at the upstream end of that path. Downstream of the rectifier 29, the first path divides. A first portion 33A, 33C serves as combustion air for the engine 27. A second portion 33B, 33D, 33E flows over the combustion heads and outer wall of the cylinder block of the engine 27, through the ducts 28 and 30 of the hot air exhaust box 67, and out the left side of the engine end panel 17. All the air of the second path 36 first cools the stabilizer 31 inside the welding machine electrical compartment 22. The second path 36 then enters the generator 26 as two portions 36A and 36B. The two portions 36A and 36B rejoin inside the generator 26, and leave the generator 26 as a single path 36C. The path 36C flows through the engine compartment 25 and out the right side of the engine end panel 17. In this manner, the rectifier 29, stabilizer 31, generator 26, and engine 27, which are the critical components of the welding machine 1 from the cooling standpoint, are all adequately cooled, while simultaneously the welding machine 1 produces minimal noise.

Thus, it is apparent that there has been provided, in accordance with the invention, a segregated cooling air flow for an engine driven welder that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. An engine driven welding machine, comprising:

a base;

electrical devices disposed within a first electrical end of said welding machine;

an internal combustion engine disposed within a second engine end of said welding machine; and means for cooling and quieting said welding machine comprising first air path means extending from first air inlet means defined within said first electrical end of said welding machine to first air outlet means defined within said second engine end of said welding machine for conducting cooling air to first selected components of said welding machine, and second air pat means, separate and independent from said first air path means, extending from second air inlet means, separate and independent from said first air inlet means, defined within said first electrical end of said welding machine to second air outlet means, separate and independent from said first air outlet means, defined within said second engine end of said welding machine for conducting cooling air to second selected components of said welding machine.

2. The welding machine of claim 1, further comprising:

an electrical compartment and a passage each having a respective air inlet end defined within said first electrical end of said welding machine;

an engine compartment and a hot air exhaust box each having a respective air exhaust end defined within said second engine end of said welding machine;

housing means for directing air from said passage to said hot air exhaust box; and fan means for directing air from said electrical compartment to said engine compartment;

said first air path means directing cooling air from said first air inlet means thereof, along said passage from said inlet end thereof to said housing means, and from said housing means to said hot air exhaust box and said air exhaust end thereof; and said second air path means directing cooling air from said second air inlet means thereof, through said electrical compartment from said inlet end thereof to said fan means, and from said fan means to said engine compartment and said air exhaust end thereof.

3. The welding machine of claim 2, wherein:

a rectifier is disposed within said passage located near said electrical end of said welding machine so that said rectifier is cooled by said cooling air directed along said first air path means immediately after air enters said first air path means through said first air inlet means thereof.

4. The welding machine of claim 2 wherein:

said housing means is located within said engine compartment and divides said cooling air within said first air path means into a first portion which passes through said engine for use as combustion air, and a second portion which passes over said engine to said hot air exhaust box.

5. The welding machine of claim 2, wherein:

a stabilizer is disposed within said electrical compartment near said electrical end of said welding machine so that said stabilizer is cooled by said cooling air directed along said second air path means immediately after air enters said second air path means through said second air inlet means thereof.

6. The welding machine of claim 2, wherein:

said fan means comprises a component of a generator interposed between said electrical compartment and said engine compartment and having a barrel with an open end and radial slots located within said electrical compartment; and said cooling air flowing along said second air path means divides within said electrical compartment so as to enter said generator through said open end and said radial slots of said barrel, and exits from said generator as a single air stream so as to continue flowing along said second air path means and into said engine compartment of said welding machine.

7. The welding machine as set forth in claim 6, wherein:

a divider wall separates said electrical compartment from said engine compartment; and said generator is mounted within and passes through said divider wall so as to fluidically connect said electrical compartment to said engine compartment.

8. The welding machine of claim 2, wherein:

said welding machine further comprises a fuel tank for said engine; and said passage is defined for a predetermined length portion thereof by the cooperation of a recess, defined within said fuel tank, and said base.

9. The welding machine of claim 1, wherein said first air path means comprises:

passage means for conducting said cooling air downstream from said first air inlet means;

housing means fluidically connected to said passage means and located downstream of said passage means for conducting said cooling air downstream of said passage means;

blower means fluidically connected to said housing means for drawing said cooling air through said first air inlet means, said passage means, and said housing means and for discharging said cooling air downstream from said blower means; and a hot air exhaust box disposed downstream from said blower means for receiving said cooling air from said blower means and for exhausting said cooling air toward said first air outlet means defined within said second engine end of said welding machine.

10. The welding machine of claim 9, wherein:

said housing means divides said first air path means into two portions such that a first portion of said cooling air flows into said engine as combustion air, and a second portion of said cooling air flows into said blower means.

11. The welding machine of claim 1, wherein said second air path means comprises:

an electrical compartment disposed downstream from said second air inlet means;

an engine compartment disposed downstream of said electrical compartment; and generator means for drawing said cooling air through said second air inlet means and said electrical compartment, and for discharging said cooling air downstream from said generator means and through said engine compartment toward said second air outlet means defined within said second engine end of said welding machine.

12. The welding machine as set forth in claim 11, wherein:

a divider wall separates said electrical compartment from said engine compartment; and said generator means is mounted within and passes through said divider wall so as to fluidically connect said electrical compartment to said engine compartment.

13. The welding machine as set forth in claim 1, wherein:

said first electrical end of said welding machine comprises a first cover panel;

said second engine end of said welding machine comprises a second cover panel;

said first and second air inlet means defined within said first electrical end of said welding machine comprises first and second sets of louvers defined within said first cover panel; and said first and second air outlet means defined within said second engine end of said welding machine comprises first and second sets of louvers defined within said second cover panel.

14. A method of cooling and quieting an engine driven welding machine having first and second ends, comprising the steps of:

conducting a first cooling air stream in a downstream direction along a first air path extending from a first air inlet, defined within said first end of said welding machine, to a first air outlet defined within said second end of said welding machine for cooling and quieting first selected components of said welding machine disposed inside said welding machine and along said first air path; and conducting a second cooling air stream, separate and independent from said first cooling air stream, in a downstream direction along a second air path, separate and independent from said first air path, extending from a second air inlet, separate and independent from said first air inlet, defined within said first end of said welding machine, to a second air outlet, separate and independent from said first air outlet, defined within said second end of said welding machine for cooling and quieting second selected components of said welding machine disposed inside said welding machine and along said second air path.

15. The method of claim 14, wherein said step of conducting said first cooling air stream along said first air path comprises the steps of:

conducting said first cooling air stream from said first air inlet over an electrical rectifier disposed within said first air path;

conducting said first cooling air stream over the exterior of an engine disposed downstream of said rectifier;

conducting said first cooling air stream to a hot air exhaust box disposed downstream of said engine; and conducting said first cooling air stream out of said hot air exhaust box and through said first air outlet.

16. The method of claim 15, wherein the step of conducting said first cooling air stream further comprises the step of:

dividing said first cooling air stream into first and second cooling air stream portions downstream of said rectifier and upstream of said engine;

conducting said first cooling air stream portion into said engine as combustion air; and conducting said second cooling air stream portion over selected outer portions of the block and head of said engine.

17. The method as set forth in claim 16, further comprising the steps of:

exhausting said first cooling air stream portion, conducted into said engine as combustion air, out of said engine, through a muffler, and out of said welding machine through means of an exhaust port defined within said second end of said welding machine; and conducting said second cooling air stream portion, conducted over said block and head portions of said engine, through a hot air exhaust box and said second air outlet defined within said second end of said welding machine.

18. The method of claim 14, wherein said step off conducting said second cooling air stream along said second air path comprises the steps of:

conducting said second cooling air stream from said second air inlet over an electrical stabilizer disposed within said second air path;

conducting said second cooling air stream through a generator disposed downstream of said stabilizer;

conducting said second cooling air stream into an engine compartment disposed downstream of said generator; and conducting said second cooling air stream out of said engine compartment and through said second air outlet.

* * * * *